(12) United States Patent
Lin et al.

(10) Patent No.: US 8,422,489 B2
(45) Date of Patent: Apr. 16, 2013

(54) PACKETIZATION TIME SETTING SYSTEM FOR VOICE SIGNALS AND SETTING METHOD THEREOF

(75) Inventors: Han-Tzung Lin, New Taipei (TW); Qiong Xiao, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 136 days.

(21) Appl. No.: 13/177,556

(22) Filed: Jul. 7, 2011

(65) Prior Publication Data
US 2012/0230306 A1     Sep. 13, 2012

(30) Foreign Application Priority Data

Mar. 11, 2011  (CN) .......................... 2011 1 0058554

(51) Int. Cl.
*H04L 12/66*       (2006.01)

(52) U.S. Cl.
USPC ........................................... 370/352; 370/338

(58) Field of Classification Search .................. None
See application file for complete search history.

(56) References Cited

U.S. PATENT DOCUMENTS
7,433,699 B2 * 10/2008 Kohno et al. ................. 455/466

* cited by examiner

*Primary Examiner* — Duc C Ho
(74) *Attorney, Agent, or Firm* — Altis Law Group, Inc.

(57) ABSTRACT

In a method for setting a packetization time of client device, simple network management protocol (SNMP) trap signals are transmitted from the client device to an element management system (EMS) to inquire a client capacity usage of each available worldwide interoperability for microwave access (WIMAX) channel. The client capacity usage is send from the base station that communicates with the EMS. A voice signal packetization time of the client device is set by comparing the client capacity usage with a predetermined threshold.

16 Claims, 4 Drawing Sheets

PACKETIZATION TIME SETTING SYSTEM FOR VOICE SIGNALS AND SETTING METHOD THEREOF

BACKGROUND

1. Technical field

The disclosure generally relates to communications systems, particularly to a packetization time setting system for voice signals and setting method based on the voice over internet protocol (VOIP).

2. Description of the Related Art

In worldwide interoperability for microwave access (WIMAX), voice quality and voice capacity of VOIP are significant parameters of voice signal packets. Operators always need to predetermine a voice signal packetization time for customers premises equipment (CPE) of the WIMAX system when establishing a VOIP call. For example, operators predetermine a relative short packetization time (e.g., 20 ms) to improve the voice quality or a relative long packetization time (e.g., 40 ms) to improve the voice capacity. However, because the method lacks flexibility, operators cannot change the voice signal packetization time unless resetting, so operators always cannot timely adjust the voice signal packetization time to balance the voice quality and voice capacity according to operational states of the WIMAX system.

Therefore, there is room for improvement within the art.

BRIEF DESCRIPTION OF THE DRAWINGS

Many aspects of an exemplary packetization time setting system and a setting method thereof can be better understood with reference to the following drawings. The components in the drawings are not necessarily drawn to scale, the emphasis instead being placed upon clearly illustrating the principles of the exemplary charging circuit. Moreover, in the drawings, like reference numerals designate corresponding parts throughout the several views. Wherever possible, the same reference numbers are used throughout the drawings to refer to the same or like elements of an embodiment.

DETAILED DESCRIPTION

Figure 1:
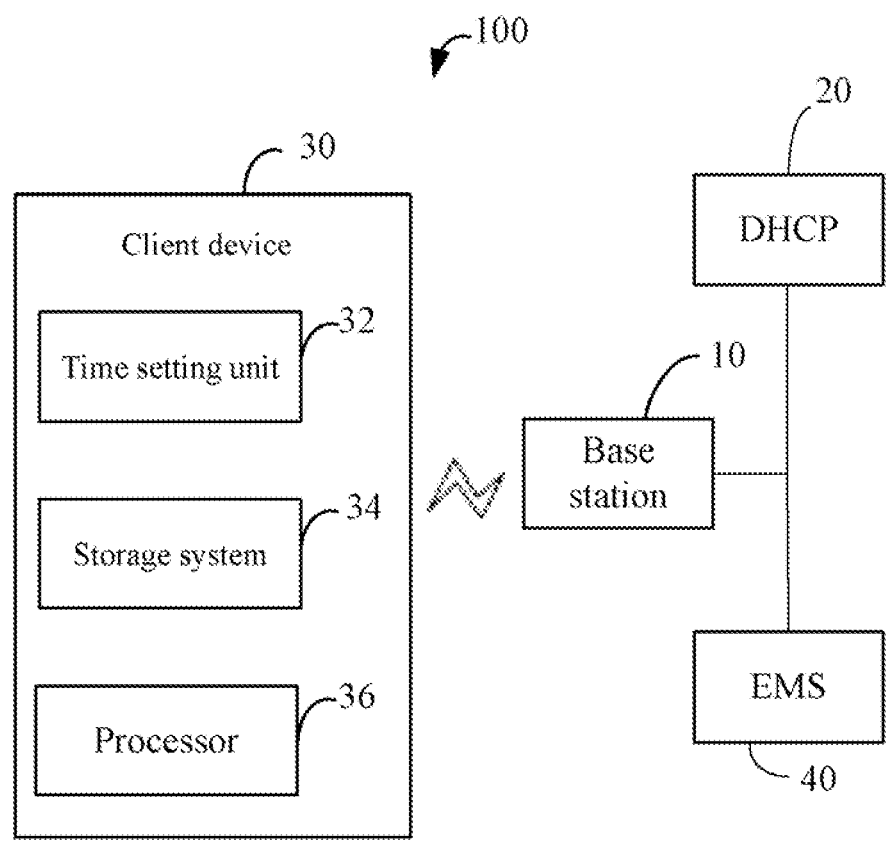
FIG. 1 is a block diagram of a packetization time setting system, according to an exemplary embodiment.
Figure 2:
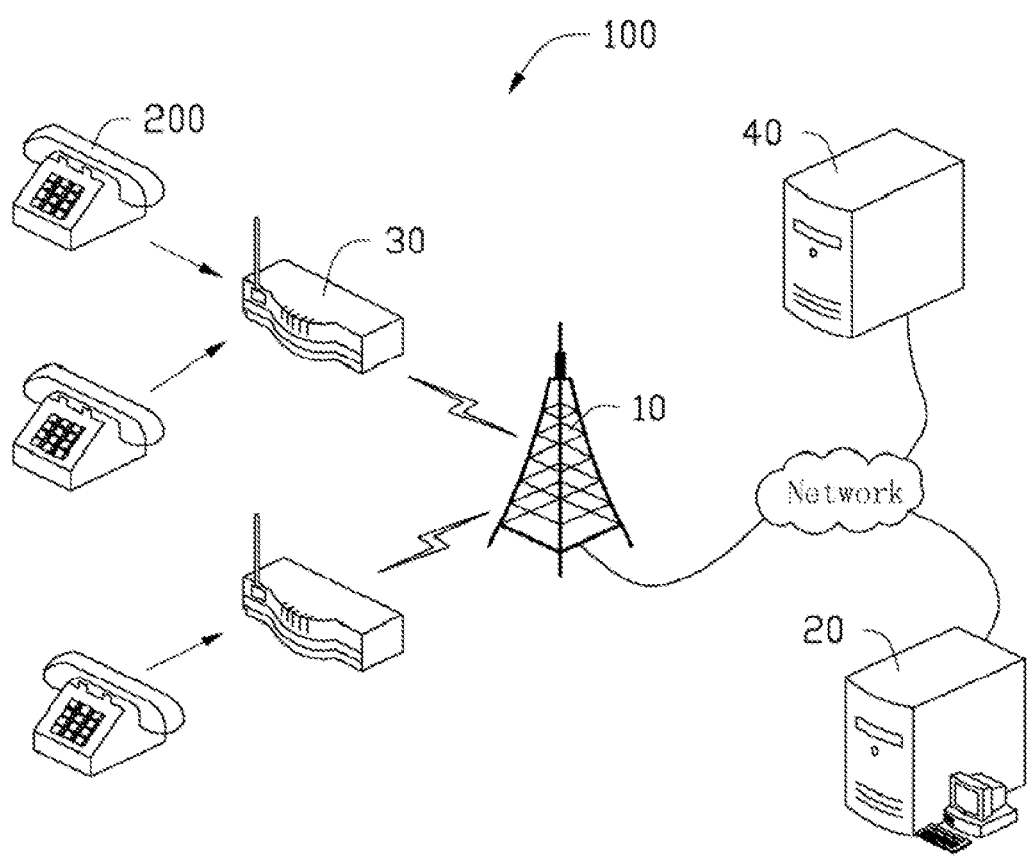
FIG. 2 is a schematic view illustrating the packetization time setting system as shown in FIG. 1.

FIG. 1 is a block diagram of a packetization time setting system 100, according to an exemplary embodiment. The packetization time setting system 100 is operable to set a voice signal packetization time according to operational states of the WIMAX system before establishing a VOIP call. Also referring to FIG. 2, the packetization time setting system 100 includes at least one base station 10, a dynamic host configuration protocol server (DHCP) 20, a plurality of client devices 30, and an element management system (EMS) 40. The client device 30 communicates with the base station 10, and further communicates with the DHCP 20 and the EMS 40 through the base station 10. The base station 10, the DHCP 20, and the EMS 40 communicates with each other via a network, such as the Internet.

The base station 10 is capable of communicating with the client devices 30 located within signal coverage areas of the base stations, and processing inquiring commands sent from the EMS 40. The inquiring commands are used to inquire a base station identity code (BSID), frequencies, bandwidth, a carrier to interference plus noise ratio (CINR), and a client capacity usage of the WIMAX system. Additionally, the base station 10 is capable of sending processed results of the inquiring commands back to the EMS 40.

The DHCP 20 is capable of getting an internet protocol (IP) address or a fully qualified domain name (FQDN) of the EMS 40 via a network, and distributing a new IP address to the client devices 30 when receiving DHCP request signals sent from the corresponding client devices 30. The DHCP 20 is also capable of transmitting the IP address or the FQDN of the EMS 40 to the client devices 30.

The client device 30 includes a time setting unit 32, a storage system 34, and a processor 36. The time setting unit 32 may include computerized instructions in the form of one or more programs that are stored in the storage system 34, and executed by the processor 36 to provide functions of the client device 30.

The time setting unit 32 is capable of getting available WIMAX channels of the base station 10 through scanning operation frequency (e.g., 2.3 GHz or 2.5 GHz), and connecting to the available WIMAX channels in order according to the CINR of the available WIMAX channels. In this exemplary embodiment, the available WIMAX channels can be three channels with larger CINR. The client device 30 connects to the available WIMAX channel with largest CINR by default, and other available WIMAX channels are regarded as spare channels. In this exemplary embodiment, the CINR difference between the connected channel and the spare channels is less than 3 dB. When the client device 30 communicates with the base station 10, the time setting unit 32 can send the DHCP request signals to the DHCP 20 through the base station 10 to request the DHCP 20 to distribute the new IP address. Meanwhile, when the time setting unit 32 gets the new IP address and the IP address or the FQDN of the EMS 40, the time setting unit 32 can exchange authentication information with the EMS 40 so that time setting unit 32 can download bootstrap programs from the EMS 40, and then communicate with EMS 40.

The client device 30 is operable to communicate with at least one telephone 200. When the telephone 200 is picked up or receives ring signals, the time setting unit 32 can transmit simple network management protocol (SNMP) trap signals to the EMS 40 to acquire the client capacity usage of each available WIMAX channel. Additionally, the time setting unit 32 is operable to compare the client capacity usage with a predetermined threshold, and then set a first value (e.g., 20 ms) or a second value (e.g., 40 ms) as the voice signal packetization time.

The EMS 40 is capable of receiving the SNMP trap signals sent from the client device 30 and transmitting the inquiring commands to the base station 10. Meanwhile, the EMS 40 is operable to receive the processed results sent from the base station 10 and transmit the processed results to the client device 30.

Figure 3A:
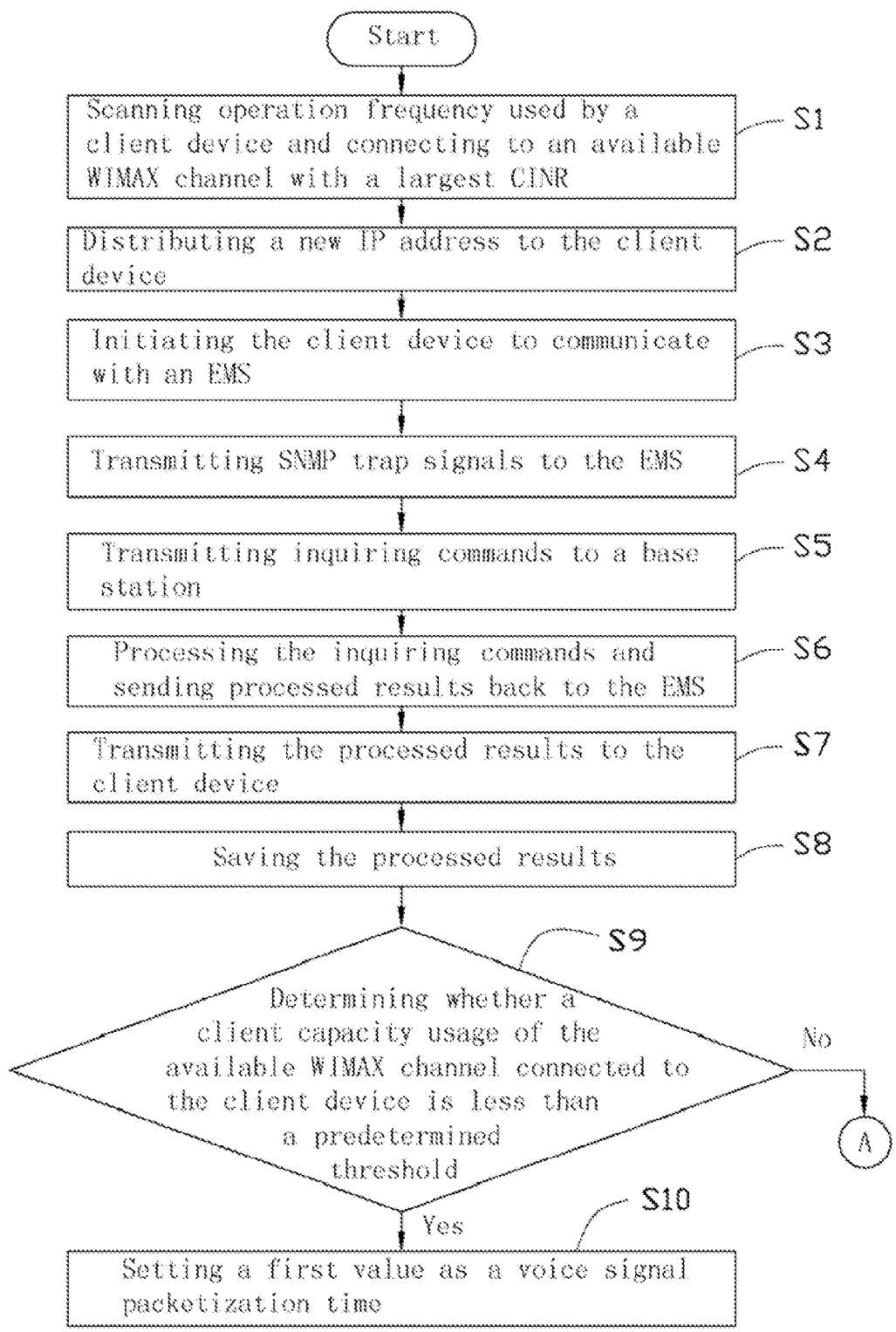
FIGS. 3A-3B are flowcharts illustrating a packetization time setting method, according to an exemplary embodiment.
Figure 3B:
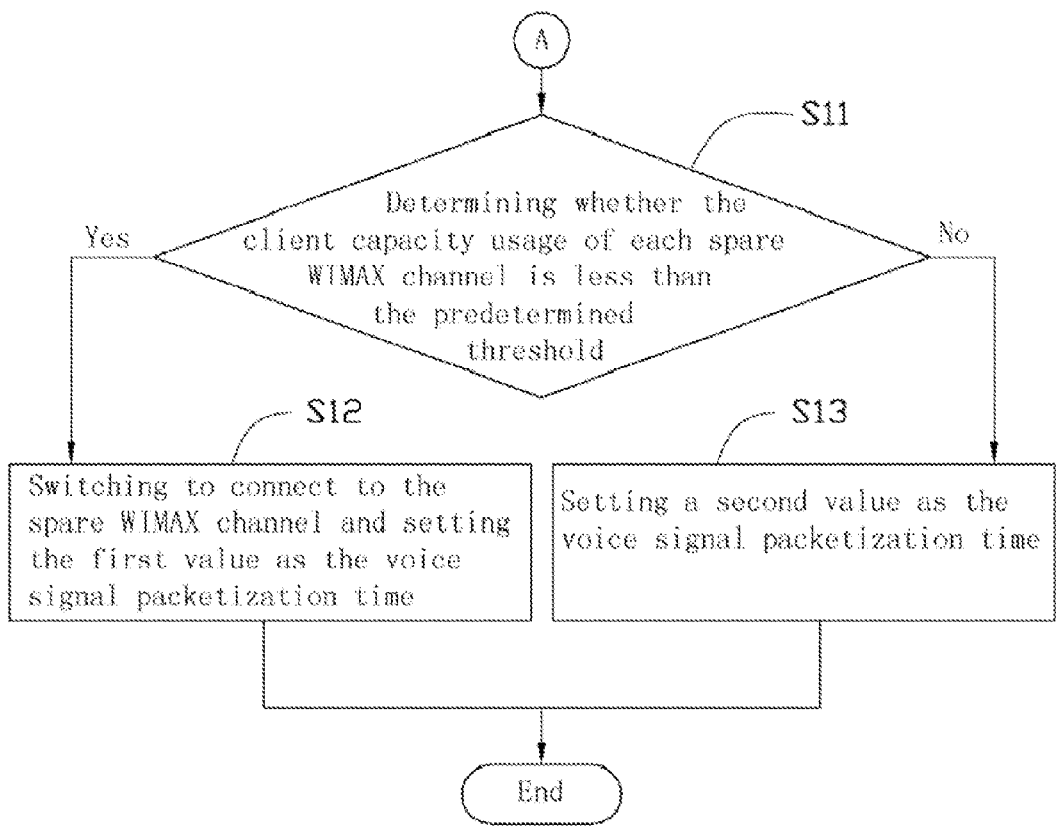

Also referring to FIGS. 3A-3B, a packetization time setting method according to an exemplary embodiment is depicted. The packetization time setting method can use the aforementioned packetization time setting system 100 and may at least include the following steps.

In step S1, the time setting unit 32 scans the operation frequency in use to get the available WIMAX channels, and then connects to the available WIMAX channel with the largest CINR.

In step S2, the time setting unit 32 transmits DHCP request signals to the DHCP 20 through the base station 10, and the DHCP 20 distributes a new IP address to the client device 30; and then transmits the IP address or the FQDN of the EMS 40 to the client device 30.

In step S3, the client device 30 begins to initialize. The time setting unit 32 exchanges the authentication information with the EMS 40 and downloads the bootstrap programs from the EMS 40, and then analyzes and updates the bootstrap programs. Thus, the time setting unit 32 can upload the bootstrap programs to the EMS 40 to communicate with the EMS 40.

In step S4, when the VOIP call is established, the time setting unit 32 transmits the SNMP trap signals to the EMS 40 to request the EMS 40 to inquire the client capacity usage of each available WIMAX channel.

In step S5, the EMS 40 receives the SNMP trap signals and transmits the inquiring commands to the base station 10.

In step S6, the base station 10 processes the inquiring commands, and gets the processed results about the BSID, the frequency, the bandwidth, the CINR, and the client capacity usage of each available WIMAX channel, and then the base station 10 sends the processed results back to the EMS 40.

In step S7, the EMS 40 transmits the processed result to the client device 30.

In step S8, the storage system 32 saves the processed result, and the time setting unit 32 sends a signal back to the EMS 40 to represent success.

In step S9, the time setting unit 32 compares the client capacity usage of the available WIMAX channel connected to the client device 30 with the predetermined threshold, if the client capacity usage is less than the predetermined threshold, step S10 is implemented; if the client capacity usage is more than the predetermined threshold, S11 is implemented.

In step S10, the time setting unit 32 sets the first value (e.g., 20 ms) as the voice signal packetization time to supply better voice quality for users.

In step S11, the time setting unit 32 compares the client capacity usage of each spare WIMAX channel with the predetermined threshold, if the client capacity usage is less than the predetermined threshold, step S12 is implemented; if the client capacity usage is more than the predetermined threshold, S13 is implemented.

In step S12, the client device 30 switches to connect to the spare WIMAX channel, and sets the first value (e.g., 20 ms) as the voice signal packetization time to supply better voice quality for users. If the client capacity usage of two or more spare WIMAX channels are all less than the predetermined threshold, the client device 30 can connect to the spare WIMAX channel with largest CINR.

In step S13, the time setting unit 32 sets the second value (e.g., 20 ms) as the voice signal packetization time to supply better voice capacity for users.

The packetization time setting system 100 can get the client capacity usage of the available WIMAX channels and automatically set the voice signal packetization time accordingly. When the time setting unit 32 sets a relative short packetization time, the packetization time setting system 100 can supply better voice quality for users, and when the time setting unit 32 sets a relative long packetization time, the packetization time setting system 100 can supply better voice capacity for users. Thus, the packetization time setting system 100 can automatically balance the voice quality and capacity according to operational states of the WIMAX system. Additionally, due to the client device 30 can switch to connect to different WIMAX channels, so the packetization time setting system 100 can indirectly balance loads of the base station 10.

It is to be understood, however, that even though numerous characteristics and advantages of the exemplary disclosure have been set forth in the foregoing description, together with details of the structure and function of the exemplary disclosure, the disclosure is illustrative only, and changes may be made in detail, especially in matters of shape, size, and arrangement of parts within the principles of exemplary disclosure to the full extent indicated by the broad general meaning of the terms in which the appended claims are expressed.

What is claimed is:

1. A client device, the client device in communication with a base station and an element management system (EMS), the client device comprising:
   a storage system;
   a processor;
   one or more programs stored in the storage system and being executable by the processor to:
   get available worldwide interoperability for microwave access (WIMAX) channels through a scanning operation frequency process;
   transmit simple network management protocol (SNMP) trap signals to the EMS to inquire a client capacity usage of each available WIMAX channel;
   acquire client capacity usage of each available WIMAX channel from the base station;
   compare the client capacity usage with a predetermined threshold; and
   set a voice signal packetization time according to the comparison of the client capacity usage and the predetermined threshold.

2. The client device as claimed in claim 1, wherein the client device further communicates with a dynamic host configuration protocol server (DHCP), where the DHCP is operable to get an internet protocol (IP) address or a fully qualified domain name (FQDN) from the EMS and transmit the IP address or the FQDN to the client device.

3. The client device as claimed in claim 2, wherein the DHCP is operable to distribute a new IP address to the client device.

4. The client device as claimed in claim 1, wherein the one or more programs are further executed by the processor to set a first value as the voice signal packetization time if the client capacity usage of one of the available WIMAX channels is less than the predetermined threshold, and the one or more programs are further executed by the processor to set a second value as the voice signal packetization time if the client capacity usage of the available WIMAX channels are all more than the predetermined threshold.

5. The client device as claimed in claim 1, wherein the one or more programs are further executed by the processor to download bootstrap programs from the EMS and update the bootstrap programs using the client device, and upload the updated bootstrap programs to the EMS.

6. The client device as claimed in claim 1, wherein the EMS is operable to transmit inquiring commands to the base station to inquire the client capacity usage.

7. The client device as claimed in claim 6, wherein the inquiring commands are used to inquire a base station identity code (BSID), frequency, bandwidth, a carrier to interference plus noise ratio (CINR), and the client capacity usage of the WIMAX system.

8. The client device as claimed in claim 7, wherein the client device connects to the available WIMAX channels in order according to value of the CINR.

9. The client device as claimed in claim 8, wherein the client device connects to the available WIMAX channel with largest CINR by default, and other available WIMAX channels are regarded as spare channels.

10. The client device as claimed in claim 9, wherein the CINR difference between the connected channel and the spare channels is less than 3 dB.

11. A packetization time setting method, comprising:
- transmitting simple network management protocol (SNMP) trap signals from a client device to an element management system (EMS) for inquiring a client capacity usage of each available worldwide interoperability for microwave access (WIMAX) channel;
- getting the client capacity usage from a base station that communicates with the EMS; and
- determining whether the client capacity usage is less than a predetermined threshold, and setting a voice signal packetization time of the client device according to the determination of the client capacity usage and the predetermined threshold.

12. The packetization time setting method as claimed in claim 11, wherein the step of determining whether the client capacity usage is less than the predetermined threshold, and setting a voice signal packetization time of the client device according to determination of the client capacity usage and the predetermined threshold further comprises:
- determining whether the client capacity usage of the available WIMAX channel connected to the client device is less than the predetermined threshold;
- setting a first value as the voice signal packetization time if the client capacity usage of the available WIMAX channel connected to the client device is less than the predetermined threshold;
- determining whether the client capacity usage of each spare WIMAX channel is less than the predetermined threshold if the client capacity usage of the available WIMAX channel connected to the client device is more than the predetermined threshold;
- switching to connect to the spare WIMAX channel and setting a first value as the voice signal packetization time if the client capacity usage of the spare WIMAX channel is less than the predetermined threshold; and
- setting a second value as the voice signal packetization time if the client capacity usage of spare WIMAX channels are all more than the predetermined threshold.

13. The packetization time setting method as claimed in claim 11, further comprising scanning operation frequency used by the client device and connecting to the available WIMAX channel with a largest carrier to interference plus noise ratio (CINR).

14. The packetization time setting method as claimed in claim 11, further comprising distributing a new IP address to the client device.

15. The packetization time setting method as claimed in claim 11, further comprising initiating the client device to communicate with the EMS.

16. The packetization time setting method as claimed in claim 11, wherein the step of getting the client capacity usage from a base station that communicates with the EMS further comprises:
- transmitting inquiring commands to the base station to inquire the client capacity usage of the WIMAX system;
- processing the inquiring commands, and sending processed results of the client capacity usage back to the EMS; and
- transmitting the client capacity usage to the client device.

\* \* \* \* \*